Dec. 25, 1934. H. FUCHS 1,985,369

SHOCK ABSORBER

Filed May 31, 1932

Inventor
Henry Fuchs.

Patented Dec. 25, 1934

1,985,369

UNITED STATES PATENT OFFICE 1,985,369

SHOCK ABSORBER

Henry Fuchs, Chicago, Ill., assignor to W. H. Miner, Inc., Chicago, Ill., a corporation of Delaware Application May 31, 1932, Serial No. 614,363

7 Claims. (Cl. 267—9)

This invention relates to improvements in shock absorbers especially adapted for use as snubbing devices in connection with springs of railway car trucks.

One object of the invention is to provide a shock absorber of simple design especially adapted for use as a snubber in connection with truck springs of railway cars and replacing the usual center coil of each cluster of coil springs of such car trucks.

Another object of the invention is to provide a friction shock absorber of the character described in the preceding paragraph including cooperating friction elements actuated upon relative approach of the bolster and spring plank of the truck and so designed as to ensure proper contact between the cooperating friction surfaces of the friction elements at all times regardless of slight relative displacement of the bolster and spring plank in lateral directions.

A more specific object of the invention is to provide a friction shock absorbing device including cooperating relatively movable friction elements wherein the friction elements always have proper full face contact with each other by employing a friction shell and cooperating friction shoes together with means for connecting the shell and shoes respectively to relatively movable actuating members, wherein the connection between the friction shoes and the corresponding movable member comprises a post having a head thereon in wedging engagement with the shoes, thereby permitting slight relative displacement of the wedge portion thereof with respect to the shoes without tilting or rocking of the shoes on the friction surfaces of the shell.

Other objects of the invention will more clearly appear from the description and claims hereinafter following.

Figure 1:
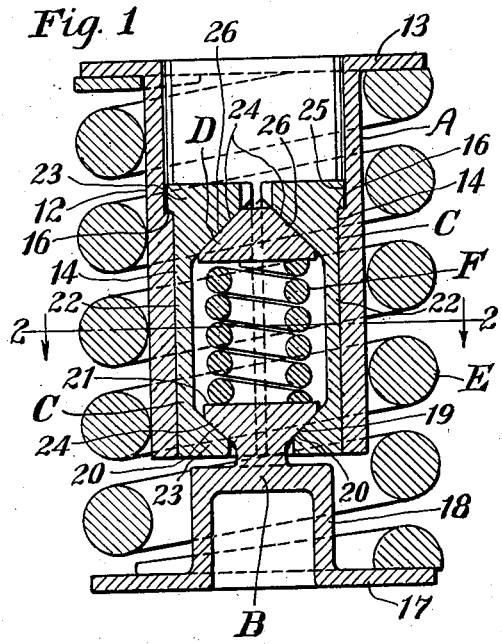
Figure 3:
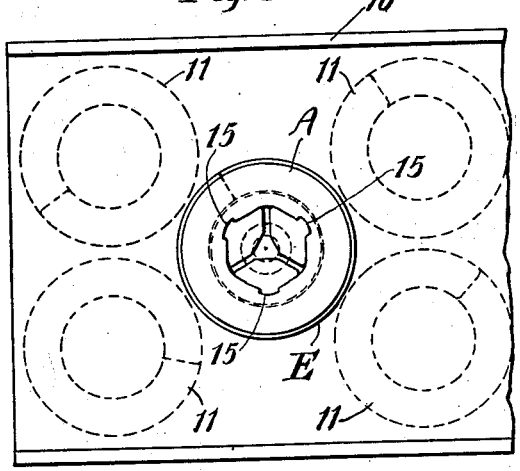
Figure 2:
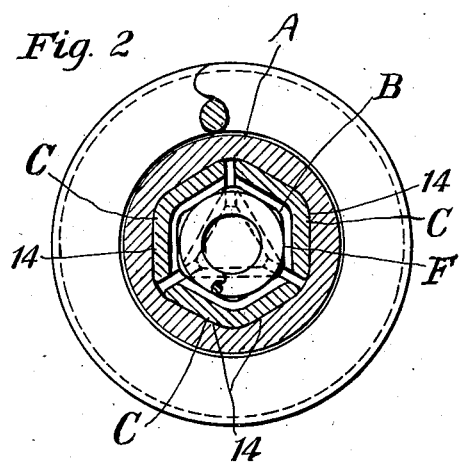
Figure 4:
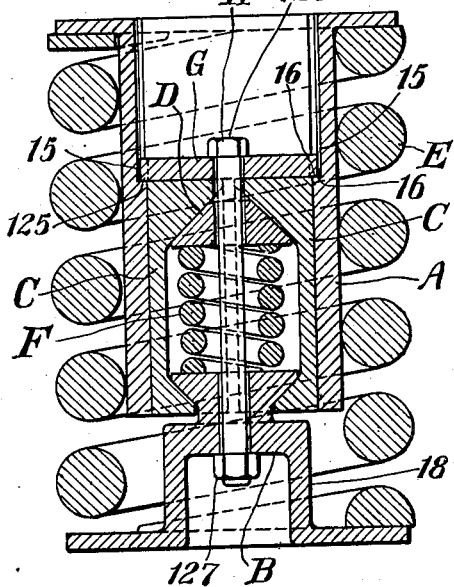

In the drawing, forming a part of this specification, Figure 1 is a vertical sectional view through my improved shock absorber. Figure 2 is a horizontal sectional view, corresponding substantially to the line 2—2 of Figure 1. Figure 3 is a plan view of the spring plank, partly broken away, of a railway car truck, illustrating my improved shock absorber in connection therewith, the shock absorber being shown on a smaller scale than in Figures 1 and 2 and disclosed as associated with four outer members of a cluster of truck springs, the spring members being illustrated in dotted lines. And Figure 4 is a view similar to Figure 1, showing another embodiment of the invention.

Referring first to the embodiment of the invention illustrated in Figures 1, 2, and 3, 10 designates the spring plank of the usual railway car truck, and 11—11—11—11 four coil springs of one of the spring clusters of the railway car truck. As will be understood, the springs 11 rest on the spring plank, and the bolster, not shown, is supported on the upper ends of the springs. My improved shock absorber is disposed centrally of the spring cluster, as shown in Figure 3, resting on the spring plank and having the upper end abutting the bolster.

My improved shock absorber proper, as illustrated in Figures 1, 2, and 3, comprises broadly a friction shell A; a wedge member B; three friction shoes C—C—C; a second wedge member D; a relatively large coil spring E surrounding the friction shell and opposing relative approach of the shell and wedge member B; and a smaller coil spring F within the shell, embraced by the shoes C—C—C, and interposed between the wedge members B and D.

The friction shell A comprises a tubelike section 12 having an annular horizontal flange 13 at the upper end thereof. The flange 13 forms abutment means for the upper end of the spring E. The tubular section 12 is preferably of substantially hexagonal interior cross section, as clearly shown in Figure 2, thereby providing three V-shaped interior, longitudinally extending, friction surfaces 14—14—14. At the upper end, the interior of the tubular section 12 of the friction shell is slotted, as indicated at 15—15—15, each slot 15 being disposed in vertical alignment with the meeting edges of the two faces of each V-shaped friction surface. The slots 15 at their bottom ends provide stop shoulders 16—16—16 for a purpose hereinafter pointed out.

The wedge member B comprises a platelike follower section 17 having an upstanding central hollow post 18 thereon provided with a head 19 at the upper end, which forms the wedge proper of said member. The head 19 is provided with three flat wedge faces 20—20—20 arranged symmetrically about the axis thereof. As clearly shown in Figure 1, the hollow post section 18 is of smaller cross sectional size than the interior of the tubular portion 12 of the friction shell so that the post 18 may freely enter the bottom end of the shell when the mechanism is compressed and the friction shell A and the wedge member B are moved toward each other. The wedge portion 19 has a flat upper end face 21, which forms abutment means for the bottom end of the spring coil F.

The three friction shoes C—C—C are arranged within the friction shell A and are of similar design. Each shoe comprises an elongated platelike portion 22 of V-shaped, transverse cross section so as to properly fit the corresponding friction surface 14 of the friction shell A. At the upper and lower ends, each shoe is inwardly enlarged, as indicated at 23—23. Each enlargement 23 is provided with an interior wedge face 24. At the upper end, each shoe also has a laterally, outwardly projecting lug 25, which is engaged within one of the grooves 15 of the friction shell A. The lugs 25—25—25 have shouldered engagement with the shoulders 16—16—16 at the lower ends of the slots 15—15—15, thereby limiting upward movement of the shell A with respect to the shoes. The wedge member 19 has wedging engagement with the wedge faces 24—24—24 at the bottom ends of the three shoes C—C—C, thus spreading the shoes apart and also opposing upward movement of the same. As will be evident, the shoes C—C—C are thus anchored to the member B by the wedge head 19 of the latter.

The wedge block D is disposed interiorly of the three friction shoes at the upper end thereof and has three wedge faces 26—26—26 having wedging engagement with the wedge faces 24—24—24 at the upper ends of the shoes.

The small coil spring F is interposed between the flat upper end face 21 of the member B and the inner end face of the wedge block D. This spring is preferably under compression when the parts are in assembled relation, thereby forcing the two wedge members apart and spreading the friction shoes C—C—C so as to bring them into tight frictional contact with the friction surfaces of the shell A.

The spring E comprises a relatively large coil, which surrounds the friction shell and has the opposite ends bearing respectively on the platelike section 17 of the member B and the flange 13 of the friction shell A. This spring is also preferably under a slight initial compression.

In the operation of my improved shock absorber upon relative approach of the friction shell A and the wedge member B, the outer spring E will be compressed therebetween and movement of the parts will be additionally resisted by the action of the friction shoes on the friction surfaces of the shell A. Inasmuch as the shoes are wedged apart by the two wedge members under the influence of the spring F, the amount of frictional resistance offered will be substantially constant throughout the approach of the friction shell A and the member B. Upon return of the parts due to the expansion of the spring E, relative movement of the shell A and the member B will also be resisted by the friction between the shell and the shoes C—C—C. As will be evident, during downward movement of the friction shell the drag on the friction shoes is also in a downward direction, thereby pulling the shoes against the wedge faces of the upper wedge member D. During upward movement of the friction shell A away from the member B, the pull on the shoes C—C—C is in an upward direction also, thereby wedging the lower ends of the shoes against the head 19 of the wedge member B. Upward movement and relative separation of the shell A with respect to the member B will be limited by engagement of the lugs 25—25—25 of the shoes with the shoulders 16—16—16 of the friction shell, thereby maintaining the mechanism of uniform overall length when the same has been fully expanded. As will be evident, when my improved shock absorbing unit is employed in connection with a cluster of truck springs, as shown in Figure 3, the vibrations of the springs 11—11—11—11 will be dampened both on relative approach and separation of the bolster and spring plank of the truck, thereby effectively dampening the shocks to which the car and lading are subjected and also cutting down the number of oscillations of the truck springs.

Referring next to the embodiment of the invention illustrated in Figure 4, the shock absorbing unit is of substantially the same design as that shown in Figures 1, 2, and 3, with the exception that means of a different character is employed for holding the mechanism assembled and of uniform overall length. The shock absorber comprises a shell A, a wedge member B, three friction shoes C—C—C, an additional wedge D, and springs E and F, all substantially the same as the corresponding parts described in connection with Figures 1, 2, and 3. The shell is also grooved, as indicated at 15—15—15, thereby providing stop shoulders 16—16—16 identical with the grooves 15 and stop shoulders 16 hereinbefore described.

The retaining means, as shown in Figure 4, comprises a plate G and a retainer bolt H. The plate G has three radial lugs 125—125—125, which have shouldered engagement with the shoulders 16—16—16 of the shell to limit upward movement of the latter. The plate G is anchored to the wedge member B by means of the bolt H, which extends through aligned openings in the wedge member B, the wedge block D, and the plate G. The head 126 of the bolt bears on the plate G, and the nut 127 at the lower end of the bolt is seated within the opening of the hollow section 18 of the member B. As will be evident, the bolt H holds the plate G against upward movement, and the latter through shouldered engagement with the shoulders 16—16—16 of the shell A limits upward movement of the latter with respect to the wedge member B.

The operation of the shock absorbing device illustrated in Figure 4 is identical with the operation of the device hereinbefore described in connection with Figures 1, 2, and 3.

I have herein shown and described what I now consider the preferred manner of carrying out my invention, but the same is merely illustrative and I contemplate all changes and modifications that come within the scope of the claims appended hereto.

I claim:

1. In a shock absorber for trucks of railway cars, the combination with a friction shell; of a follower, said shell and follower being movable toward and away from each other; a plurality of friction shoes telescoped within the shell, said shoes having interior wedge faces at one set of ends, and laterally, inwardly extending projections at the other set of ends; a block bearing on said projections; a wedge post rigid with said follower and movable therewith toward and away from said shell, said post having the inner end thereof disposed between the shoes, said inner end of the post having wedging engagement with the wedge faces of the shoes; spring means bearing at one end on the inner end of the wedge post and having the other end bearing on said block; and additional spring means opposing relative movement of the friction shell and follower.

2. In a shock absorber for trucks of railway cars, the combination with a friction shell; of follower means movable toward and away from the shell; a plurality of friction shoes within the shell, said shoes having interior opposed, outwardly converging wedge faces at their outer ends; a wedge block having wedge faces correspondingly inclined to the wedge faces of the shoes and in wedging engagement with the wedge faces of the shoes; spring resistance means bearing at one end on said wedge block and having the other end buttressed against the ends of the shoes remote from the wedge block and tending to force the shoes away from said block, said wedge block being rigid with the follower means; and additional spring resistance means opposing relative movement of the friction shell and follower means.

3. In a shock absorber for trucks of railway cars, the combination with a friction shell; of a plurality of friction shoes within the shell having sliding frictional engagement with the friction surfaces thereof, said shoes having outwardly converging inner wedge faces at opposite ends; wedge members at opposite ends of the shoes having wedging engagement with the wedge faces of the shoes; spring means bearing at opposite ends on said wedge members; follower means rigid with one of said wedge members, said follower means being movable with respect to said shell lengthwise of the mechanism; and additional spring resistance means opposing relative movement of the follower means and friction shell.

4. In a shock absorber for trucks of railway cars, the combination with a friction shell having a spring abutment flange thereon; of a follower means movable toward and away from the shell; a post rigid with said follower means projecting into the shell, said post having wedge faces thereon inclined outwardly toward the end of the post away from the longitudinal axis of said post; a plurality of friction shoes slidable within the shell, said shoes having sets of opposed, outwardly converging, inner wedge faces at opposite ends thereof, one of said sets engaging the wedge faces of said post; a wedge block having wedging engagement with the faces of the other set; a spring interposed between the end of the post and said wedge block and bearing at opposite ends on said post and block; and a second spring surrounding the shell and bearing at opposite ends respectively on the follower means and flange of the shell.

5. In a shock absorber for trucks of railway cars, the combination with a friction shell having a spring abutment flange thereon; of a follower means movable toward and away from the shell; a post rigid with said follower means projecting into the shell, said post having wedge faces thereon; a plurality of friction shoes slidable within the shell, said shoes having sets of inner wedge faces at opposite ends thereof, one of said sets engaging the wedge faces of said post; a wedge block having wedging engagement with the faces of the other set; a spring interposed between the end of the post and said wedge block; a second spring surrounding the shell and bearing at opposite ends respectively on the follower means and flange of the shell; and means having shouldered engagement with the shell for limiting relative separation of the shell and follower means.

6. In a shock absorber for trucks of railway cars, the combination with a friction shell; of follower means movable toward and away from the shell; a plurality of friction shoes within the shell, said shoes having interior wedge faces at their outer ends; a wedge block having wedging engagement with the wedge faces of the shoes; spring resistance means buttressed at one end against the inner ends of the shoes and bearing at the other end on said wedge block, said wedge block being anchored to the follower means; additional spring resistance means opposing relative movement of the friction shell and follower means; and means for limiting relative separation of the follower means and shell including a plate provided with lugs having shouldered engagement with the shell and a bolt anchoring said plate to the follower means.

7. In a shock absorber for trucks of railway cars, the combination with a friction shell having longitudinally disposed, interior friction surfaces; of a plurality of friction shoes within the shell having sliding frictional engagement with said surfaces, each shoe having inward enlargements at opposite ends provided with opposed, outwardly converging wedge faces on the inner sides thereof; a follower, said follower and shell being movable toward and away from each other, said follower having a post rigid therewith; wedge means at the inner end of the post having wedging engagement with the wedge faces at one set of ends of said shoes; a wedge block having wedging engagement with the wedge faces at the other set of ends of the shoes; a spring bearing at one end on the inner end of said post and at the other end on the wedge block; and an additional spring opposing relative approach of the follower and friction shell.

HENRY FUCHS.